US010938834B2

(12) United States Patent
Lewis et al.

(10) Patent No.: US 10,938,834 B2
(45) Date of Patent: Mar. 2, 2021

(54) DYNAMIC DISCOVERY RANGE FOR ONLINE SESSIONS

(71) Applicant: MICROSOFT TECHNOLOGY LICENSING, LLC, Redmond, WA (US)

(72) Inventors: Jason Tyler Lewis, Duvall, WA (US); Darene Brice Lewis, Bothell, WA (US); Uday Sasidharan Unni, Newcastle, WA (US); Christopher David Gual, Seattle, WA (US); Venkata Ramalingamurthy Meduri, Sammamish, WA (US); Swati Kanaujia, Redmond, WA (US); Roopa Sampaguita Chickerur, Sammamish, WA (US); Adam Carl Wyss, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 16/046,923

(22) Filed: Jul. 26, 2018

(65) Prior Publication Data

US 2020/0036726 A1    Jan. 30, 2020

(51) Int. Cl.
*H04L 29/06*        (2006.01)

(52) U.S. Cl.
CPC .......... *H04L 63/107* (2013.01); *H04L 63/104* (2013.01); *H04L 63/20* (2013.01)

(58) Field of Classification Search
CPC ........................... H04L 63/104; H04L 63/107
See application file for complete search history.

(56) References Cited

U.S. PATENT DOCUMENTS

| 8,471,701 | B2 | 6/2013 | Yariv et al. |
| 9,264,874 | B2 | 2/2016 | Fraccaroli |
| 9,432,806 | B2 | 8/2016 | Zises |
| 9,786,176 | B2 | 10/2017 | Northrup et al. |
| 2003/0037110 | A1 | 2/2003 | Yamamoto |
| 2010/0293104 | A1 | 11/2010 | Olsson et al. |
| 2015/0256353 | A1 | 9/2015 | Busey et al. |

(Continued)

OTHER PUBLICATIONS

Hoyos, Brandon De., "Top 5 Free Webcam Sites", Retrieved From https://www.lifewire.com/top-free-webcam-sites-1949829, Retrieved on Apr. 27, 2018, 14 Pages.

(Continued)

*Primary Examiner* — William S Powers
(74) *Attorney, Agent, or Firm* — NovoTechIP International PLLC

(57) ABSTRACT

A data processing device is disclosed, which selectively grants devices access to an online session if the devices satisfy a discovery range requirement. The online session is associated with the discovery range requirement by which the online session is selectively discoverable by the devices. The data processing device determines an access metric representing interactions related to the online session, and adjusts the discovery range requirement based on the determined access metric such that the online session is discoverable by more or fewer devices. The data processing device then selectively grants the devices access to the online session based on the adjusted discovery range requirement.

20 Claims, 8 Drawing Sheets

(56) References Cited

U.S. PATENT DOCUMENTS

| | | | | |
|---|---|---|---|---|
| 2016/0165002 A1* | 6/2016 | LeBeau | ................... | H04W 4/21 |
| | | | | 709/204 |
| 2016/0316503 A1* | 10/2016 | Raphael | ................... | H04W 4/80 |
| 2017/0180961 A1 | 6/2017 | Gauglitz et al. | | |
| 2017/0289074 A1 | 10/2017 | Joo et al. | | |
| 2018/0107440 A1* | 4/2018 | Knoppert | .............. | G06F 3/0481 |
| 2018/0278605 A1* | 9/2018 | Fitterer | ............... | H04L 63/0861 |

OTHER PUBLICATIONS

Wan, Zhentian, "O-Mopsi: Location-based Orienteering Mobile Game", In Master's Thesis of University of Eastern Finland, Aug. 28, 2014, pp. 1-69.

"International Search Report and Written Opinion Issued in PCT Application No. PCT/US2019/038072", dated Sep. 12, 2019, 11 Pages.

* cited by examiner

DYNAMIC DISCOVERY RANGE FOR ONLINE SESSIONS

BACKGROUND

Many enterprises and people use the social media or social networking services (SNS), such as, Facebook™, Twitter™, Instagram™, Snapchat™ and the like, to post their marketing or personal contents, hoping that their contents to go viral and reach thousands, or even millions of people. On the other hand, the SNS users do not want to see the user interfaces of the SNS apps and programs cluttered with every single post from every single social connection, for example, a SNS friend, SNS group, SNS liked page, SNS account that the users follow, and the like. Hence, most SNS companies have implemented algorithms to limit the amount of posts that the users can see on the user interface, which has made it more difficult for the users to increase the exposure for the information they posted on the SNS. For the SNS companies dealing with an excessive amount of information posted by millions of the users spread out all over the world, it has become more and more difficult to accurately identify and provide personalized information to each user. Accordingly, there still remain significant areas for new and improved implementations for providing and discovering highly relevant and personalized information over a communication network.

SUMMARY

A data processing system is disclosed, which includes one or more processors and memory in communication with the one or more processors. The memory includes executable instructions that, when executed by the one or more processors, cause the data processing system to perform functions of hosting an online session associated with an access policy for selectively granting access to the online session, wherein the online session is accessible via a communication network and the access policy includes a discovery range requirement by which the online session is discoverable by devices in communication with the data processing system via the communication network; selectively granting the devices access to the online session if the devices satisfy the discovery range requirement; determining an access metric representing interactions related to the online session; adjusting the discovery range requirement based on the determined access metric and a range adjustment policy specifying conditions of the access metric that trigger adjustment to the discovery range requirement and a manner that the discovery range requirement should be adjusted, wherein the discovery range requirement is adjusted to allow the online session to be discoverable by more or fewer devices; and selectively granting the devices access to the online session based on the adjusted discovery range requirement.

In another implementation, a method for operating a data processing system is disclosed, which includes hosting an online session associated with an access policy for selectively granting access to the online session, wherein the online session is accessible via a communication network and the access policy includes a discovery range requirement by which the online session is discoverable by devices in communication with the data processing system via the communication network; selectively granting the devices access to the online session if the devices satisfy the discovery range requirement; determining an access metric representing interactions related to the online session; adjusting the discovery range requirement based on the determined access metric and a range adjustment policy specifying conditions of the access metric that trigger adjustment to the discovery range requirement and a manner that the discovery range requirement should be adjusted, wherein the discovery range requirement is adjusted to allow the online session to be discoverable by more or fewer devices; and selectively granting the devices access to the online session based on the adjusted discovery range requirement.

In another implementation, a data processing device is disclosed, which includes means for selectively granting devices in communication with the data processing device via a communication network access to an online session if the devices satisfy a discovery range requirement, the online session accessible via the communication network and associated with the discovery range requirement by which the online session is selectively discoverable by the devices; means for determining an access metric representing interactions related to the online session; means for adjusting the discovery range requirement based on the determined access metric such that the online session is discoverable by more or fewer devices; and means for selectively granting the devices access to the online session based on the adjusted discovery range requirement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
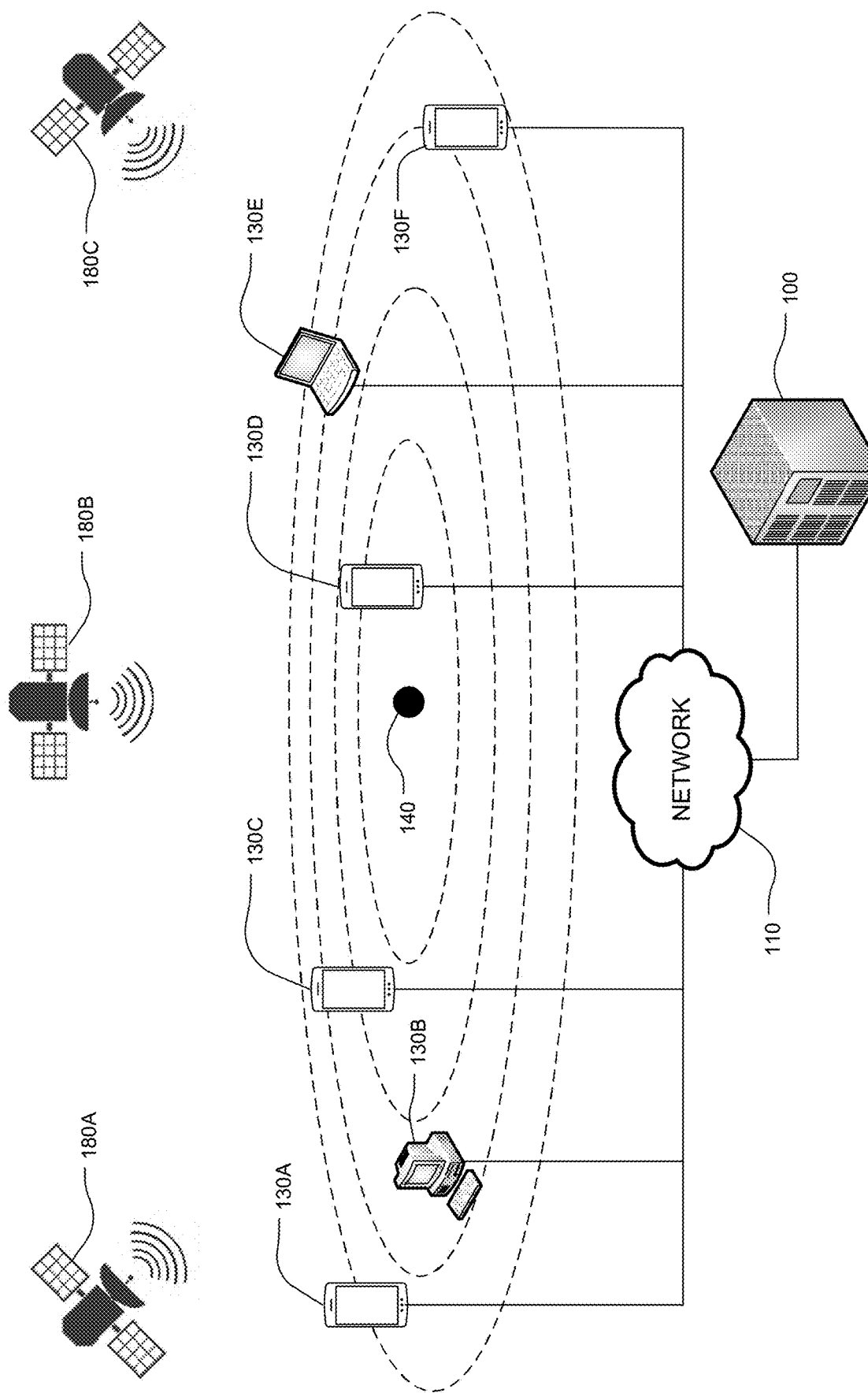
FIG. 1 illustrates an example server connected via a communication network to a plurality of user devices to implement various aspects of the disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

On a daily basis, SNS users deal with a large number of posts and advertisements that have very little or no relevance to them. Although most SNS companies have implemented algorithms to limit the amount of posts that the users can see, it is still a difficult task to identify information that is substantially relevant to individual user. Also, due to the limiting algorithm, it has become more difficult for the SNS users to increase the exposure for the information they posted on the SNS.

This description provides technical solutions to these ongoing problems in the SNS technologies. The technical solutions include dynamically adjusting a discovery range requirement for an online session based on user interactions related to the online session. This may allow the online session to become gradually discoverable by more and more users in an order of a degree of relevance. This may allow to identify and provide online sessions having a higher relevance to each user. Also, the users may be able to quickly discover, join and participate in online sessions that have at least a certain degree of relevance to them. Hence, an online session created for a specific subject may be directly exposed to a target demographic, which may grow exponentially as more and more people interact in relation to the online session.

The discovery range requirement may be related to a geographic proximity limit, social proximity limit, access privilege limit, or any combination thereof. The online session may include a group conferencing session (e.g., chatroom, bulletin board and discussion forum). For example, the online session may be a chatroom about a book signing event at a local bookstore. The chatroom may be created by a user who may be visiting the bookstore and finding out about the event.

A data processing system hosting the chatroom may communicate with user devices via a communication network in order to make the chatroom selectively discoverable on the devices within an initial geographic proximity limit (e.g., one mile radius from the bookstore). As more users discover, join and participate in the chatroom, the data processing system may increase or expand the geographic proximity limit such that the chatroom becomes discoverable on more devices within the expanded geographic proximity limit (e.g., a two mile radius from the bookstore). The geographic proximity limit may be gradually increased at a predetermined increment value (e.g., one mile) as the user interactions related to the chatroom continue to grow. When the book signing event is over and the user interactions dwindle down, the data processing system may gradually decrease the geographic proximity limit at a predetermined decrement value (e.g., one mile or two miles). When the user interactions reach to an insignificant level, the data processing system may set the geographic proximity limit to zero or null, and the chatroom may become no longer discoverable on any of the devices.

As such, by dynamically adjusting a discovery range requirement for an online session based on the interactions related to the online session, the online session may become gradually discoverable by more and more users in an order of a degree of relevance (e.g., geographic proximity) to the online session (e.g., the bookstore). This may allow for the data processing system to identify and provide online sessions having a higher relevance to each user. This may also allow the users to quickly discover, join and participate in online sessions that have a certain degree of relevant to them. Furthermore, an online session may be directly exposed to a target demographic which may in turn contribute to increasing the discovery range requirement. With this overview, attention is now turned to the figures to described various implementations of the presenting teachings.

FIG. 1 illustrates an example server 100 connected to a plurality of user devices 130A, 130B, 130C, 130D, 130E and 130F (collectively referred to as user devices 130 hereinafter) via a communication network 110. The server 100 may be any data processing device or system capable of providing support functionalities for other devices. For example, the server 100 may be an application server, catalog server, file server, web server, communication server or a combination of two or more servers with various functionalities. The server 100 may be located at the centralized location or spread out at various geographic locations. The network 110 may be any wired or wireless network, or a combination of wired and wireless networks.

The user devices 130 may be any computing device communicable via the network 110. For example, the user devices 130 may be a smartphone, mobile phone, tablet, desktop, laptop, server or the like. The user devices 130 may include one or more mobile devices (e.g., smartphones 130A, 130C, 130D and 130F) and one or more stationary devices (e.g., laptop PC 130B and desktop PC, 130E). Only one server 100 and six user devices 130 are shown in FIG. 1, but the actual number, type and connections of the server 100 and the user devices 130 may vary and are not limited to the specific implementations in this disclosure.

Some of the user devices 130 (e.g., smartphones 130A, 130C, 130D and 130F) may be equipped with location determination functionalities. For example, the user devices 130 may be equipped with Global Positioning System (GPS) capabilities to receive the GPS signals from GPS satellites 180A, 180B and 180C, and triangulate a current geographic location based on the GPS signals. Alternatively or additionally, the user device 130 may determine their locations based on, for example, Received Signal Strength Information (RSSI) of a nearby base station or access point. For those user devices 130 having no location determination capabilities (e.g., stationary devices 130B, 130E), the locations may be determined based on account information (e.g., address) associated with each user device 130, which may be collected when a user signs up for an online session hosted by the server 100, or subscriber information associated with the IP addresses. Based on the current geographic location, the user devices 130 may be capable of determining a distance and relative location from any arbitrary location 140.

The server 100 may be configured to host an online session. The online session may be created by one of the user devices 130. Alternatively or additionally, the online session may be created by the server 110. The online session may be a group conferencing session (e.g., chatroom, bulletin board, discussion forum, etc.). The online session may be created for an event, activity, news, announcement, advertisement, promotion, person or group. The online session may be associated with a geographic location. For example, a chatroom created for a book signing event at a bookstore may be associated with a geographic location of the bookstore. Alternatively, the online session may not be associated with any geographic location. For example, a chatroom may be created for members of a multinational organization to discuss about a common issue among the members located on different countries. In this case, the chatroom may have no association with any particular geographic location. Instead, the chatroom may be associated with a membership level (e.g., staff, management, executive, etc.) or membership group (e.g., product development, marketing, human resource, legal, etc.).

In an implementation, the online session may be linked to a conferencing application (e.g., a mobile or desktop group conferencing app) installed in the user devices 130, or a website where the online session can be accessed via a web browser.

The online session may be associated with an access policy to selectively grant access thereto. The access policy may include a discovery range requirement. The discovery range requirement may include a discovery range limit for the online session, within which the online session may become discoverable on the user devices 130. The discovery range requirement may include a geographic proximity limit, a social proximity limit, and/or an access privilege limit.

The geographic proximity may include a distance from the location of the device creating the online session. Alternatively, the geographic proximity may include a distance from the location that is remote from the device creating the online session. The social proximity may include a degree of separation from a person on one or more social networks. The access privilege may include a level or type of privilege associated with a user or an online session.

The server 100 may adjust the discovery range requirement based on an access metric and a range adjustment policy. The access metric may represent the user interactions with the online session, for example, a number of the user devices 130 participating in the online session, a number of the interactions (e.g., posts, messages, replies) related to the online session, a number of the user devices 130 joining the online session, a number of the user devices 130 leaving the online session, a time of a latest interaction with the online session, and/or the like. The access metric may be implemented in a format of a grade or a numeric value on a scale or range. For example, the access metric may be implemented as a numeric value of an access metric range having a bottom limit (e.g., "1") and top limit (e.g., "100"). The access metric may be implemented such that the numeric value may transition toward the top limit when a high volume of the user interactions is detected, for example, when ten or more new users have joined the online session for the last ten minutes. When the user interactions become less frequent or active, the access metric may transition toward the bottom limit.

The range adjustment policy may specify conditions of the access metric that may trigger adjustment to the discovery range requirement. The range adjustment policy may also specify a manner that the discovery range requirement should be adjusted. For example, the range adjustment policy may specify one or more zones within which adjustment may be made. The access metric range may include a no-adjustment zone, which may be predetermined to indicate a situation where a certain level of the user interactions is detected but not to a level that requires any adjustment to the discovery range requirement. When the access metric transitions over the no-adjustment zone, the server 100 may trigger adjustment to the discovery range requirement by, for example, increasing a geographic range limit at a predetermined increment value (e.g., one mile). As more and more users 130 discover, join and participate in the online session, the server 100 may gradually increase or expand the discovery range requirement. This may allow the online session to be directly exposed to a target demographic which may in turn contribute to increasing the discovery range requirement. When the access metric transitions below the no-adjustment zone, the server 100 may decrease the discovery range limit at a predetermined decrement value (e.g., two miles).

The range adjustment policy may include one or more stop conditions. When the one or more stop conditions are met, the server 100 may set the discovery range limit to zero or null such that the online session becomes undiscoverable from any of the user devices 130. For example, when no user interactions have been detected for a predetermined period (e.g., twenty four hours), it may mean that the online session is no longer relevant to any of the users. Then, the server 100 may set the discovery range limit to zero or null such that the online session is no longer discoverable on any of the user devices 130. This may allow to reduce or eliminate any unnecessary or irrelevant online sessions from showing up on the user devices 130.

Figure 2A:
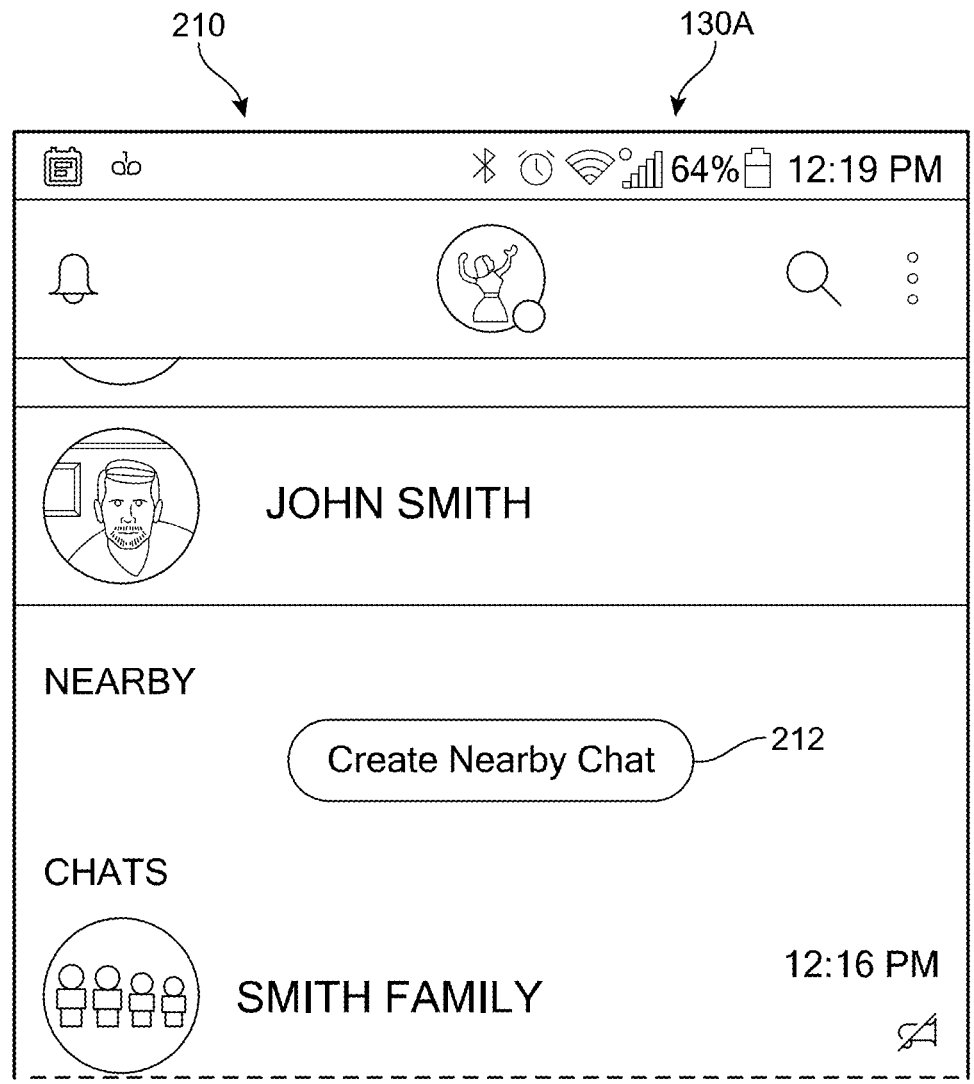
FIG. 2A illustrates an example user interface of a conferencing application installed on a user device for creating an online session.

FIG. 2A illustrates an example user interface 210 of a conferencing application installed on a user device 130A in communication with the server 100 via the communication network 110. The user interface 210 may be implemented to allow a user to create an online session. For example, the user interface 210 may include a "Create Nearby Chat" button 212. By clicking the button 212, the user may be allowed to enter nearby chat information (e.g., event name, location, date, time, etc.). The location may be automatically generated by the user device 130 using the location determination capabilities (e.g., GPS position sensing capabilities). The server 100 may receive the nearby chat information from the user device 130A and create and host a chatroom called "Book Concert." The server 100 may then communicate with other user devices 130 such that the "Book Concert" chatroom is discoverable by the other user devices 130 within an initial geographic range limit.

Figure 2B:
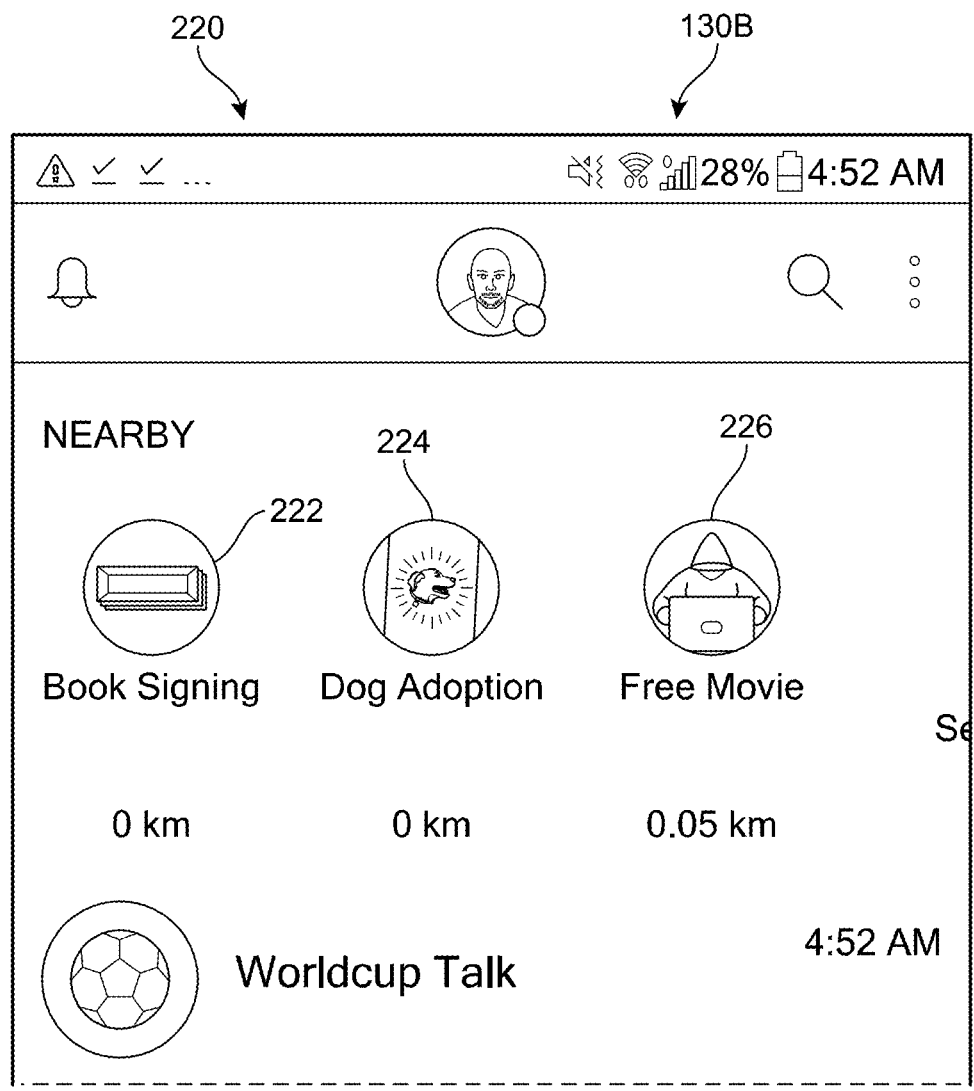
FIG. 2B illustrates another example user interface of the group conferencing application installed on another user device, on which an icon representing the online session created by the user device of FIG. 2A is displayed.

FIG. 2B illustrates another example user interface 220 of the group conferencing application installed on another user device 130B within the geographic range limit. The user interface 220 may display one or more online sessions that are geographically relevant to the user. The geographic relevancy may be determined based on a geographic proximity of the user device 130B to the location associated with the online sessions. The one or more online sessions may be displayed in a form of an icon, picture or text label on the user interface 220. This may allow the one or more online sessions to be discovered and selected by the user. For example, the user interface 220 may display a "Book Concert" icon 222, "Dog Adaption" icon 224 and "Free Movie" icon 226, which represent chatrooms that are geographically relevant to the user. The user interface 220 may also display an estimated distance (e.g., 0 Km, 0.05 Km) of the user device 130B from the location associated with each chatroom. The user may then select one of the icons 222, 224, 226 to join and participate in the chatroom associated with them. The user's interactions related to a chatroom may be provided to the server 100. The sever 100 may collect the user interactions from multiple user devices 130 and analyze to determine the access matrix for the particular chatroom. For example, the user interactions may include a number of the user devices 130 participating in the online session, a number of the interactions (e.g., posts, messages, replies) related to the online session, a number of the user devices 130 joining the online session, a number of the user devices 130 leaving the online session, a time of a latest interaction with the online session, and/or the like.

The server 100 may provide filtering features such that the online sessions directed to one or more topics that the user is interested in may be filtered out from among the plurality of topics and displayed to the user. For example, the user interface 220 may display to the user one or more tags, such as, sports, event, traffic, lost and found, etc. Alternatively, the user may enter or identify the topics of interests to the user via the user interface 220, for example, by typing or speaking. When the sports tag is selected by the user, the server 100 may filter the online sessions that are geographically relevant to the user such that only the online sessions related to the sports are displayed on the user interface 220. While the sports tag is selected, the user interface 220 may not alert the user about the online sessions that are not tagged with the sports tag. The online sessions may be automatically tagged by the server 100 based on the contents (e.g., a title or description). Alternatively or additionally, when an online session is created, a user may tag the online session with a specific topic, such as, sports, event, traffic, lost and found, etc.

Figure 3:
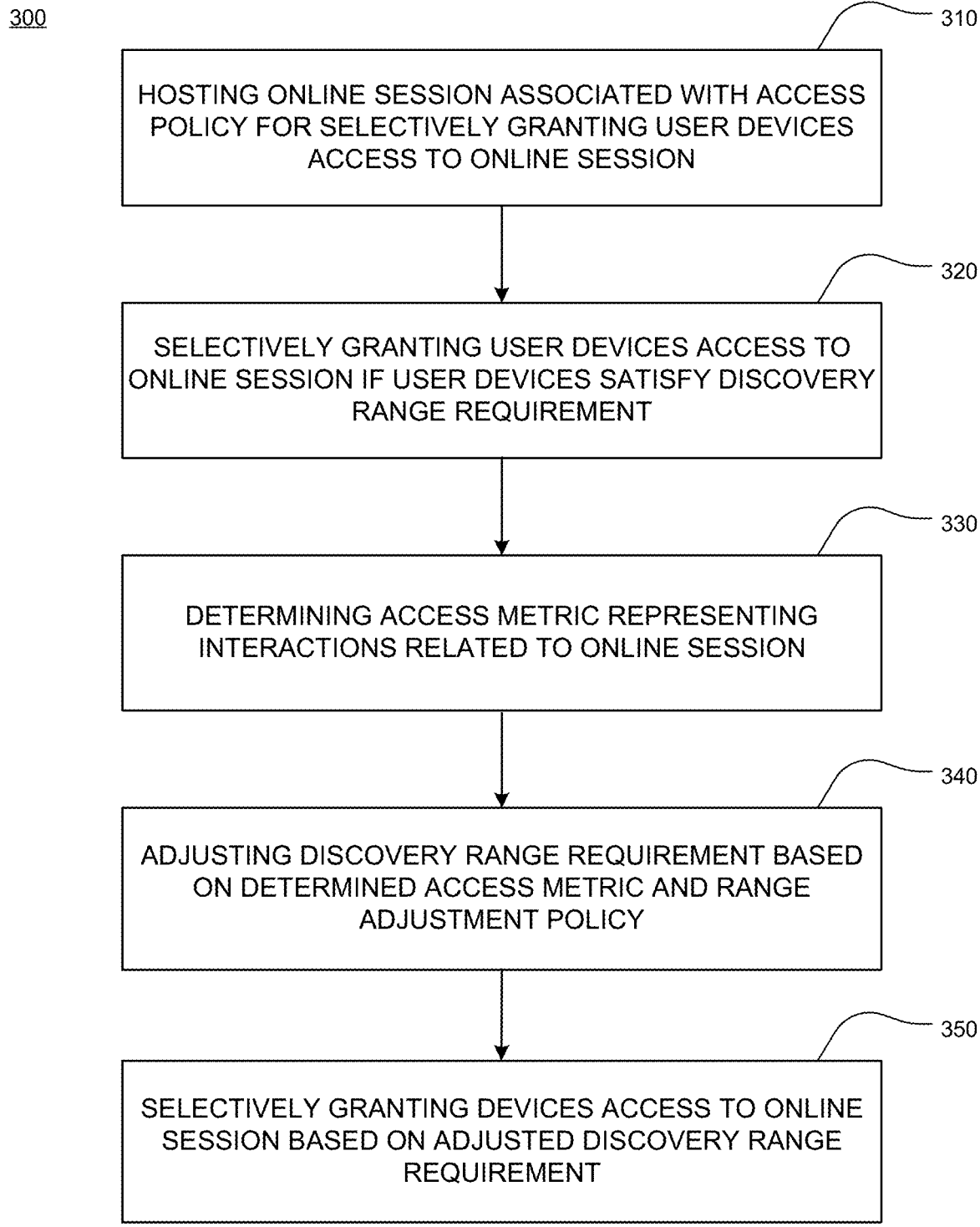
FIG. 3 illustrates a flowchart of an example process for adjusting a discovery range requirement by which the online session shown in FIG. 2B is accessible by devices in communications with the server shown in FIG. 1.

FIG. 3 illustrates a flowchart of an example process 300 for adjusting a discovery range requirement by which the online session shown in FIG. 2B is accessible by devices in communications with the server shown in FIG. 1. With reference to FIG. 1, at step 310, the server 100 may host an online session associated with an access policy for selectively granting the user devices 130 access to the online session. As described above, the access policy may include a discovery range requirement by which the online session is discoverable by devices 130 in communication with the server 100 via the network 110. The discovery range requirement may include or be associated with at least one of a geographic proximity limit, social proximity limit and access privilege limit, within which the online session may become discoverable on the user devices 130.

At step 320, the server 100 may selectively grant the user devices 130 access to the online session if the user devices 130 satisfy the discovery range requirement. This may allow the online session to be discoverable on the user devices 130 satisfying the discovery range requirement. The user interactions related to the online session may be collected and provided to the server 100. As described above, the user interactions may include the users' selection of and participation in the online session, for example, a number of the user devices 130 participating in the online session, a number of the interactions (e.g., posts, messages, replies) related to the online session, a number of the user devices 130 joining the online session, a number of the user devices 130 leaving the online session, a time of a latest interaction with the online session, and/or the like.

At step 330, the server 100 may determine an access metric representing the user interactions related to the online session. The access metric may be implemented as a numeric value of an access metric range. The numeric value may transition toward the top limit of the access metric range when a high volume of the user interactions is detected. When a low volume of user interactions has been detected, the access metric may transition toward the bottom limit of the range. Alternatively, the access metric may be implemented as a grade or level. For example, the access metric may be implemented to indicate one of a plurality of levels. Each level may indicate a different degree of the user interactions. For example, when a high volume of the user interactions is detected, the access metric may indicate a high level. When the user interactions dwindle down, the access metric may switch to a middle or lower level. When there are no user interactions, the access metric may indicate a stop level. Other implementations are also contemplated for the access metric.

Figure 4:
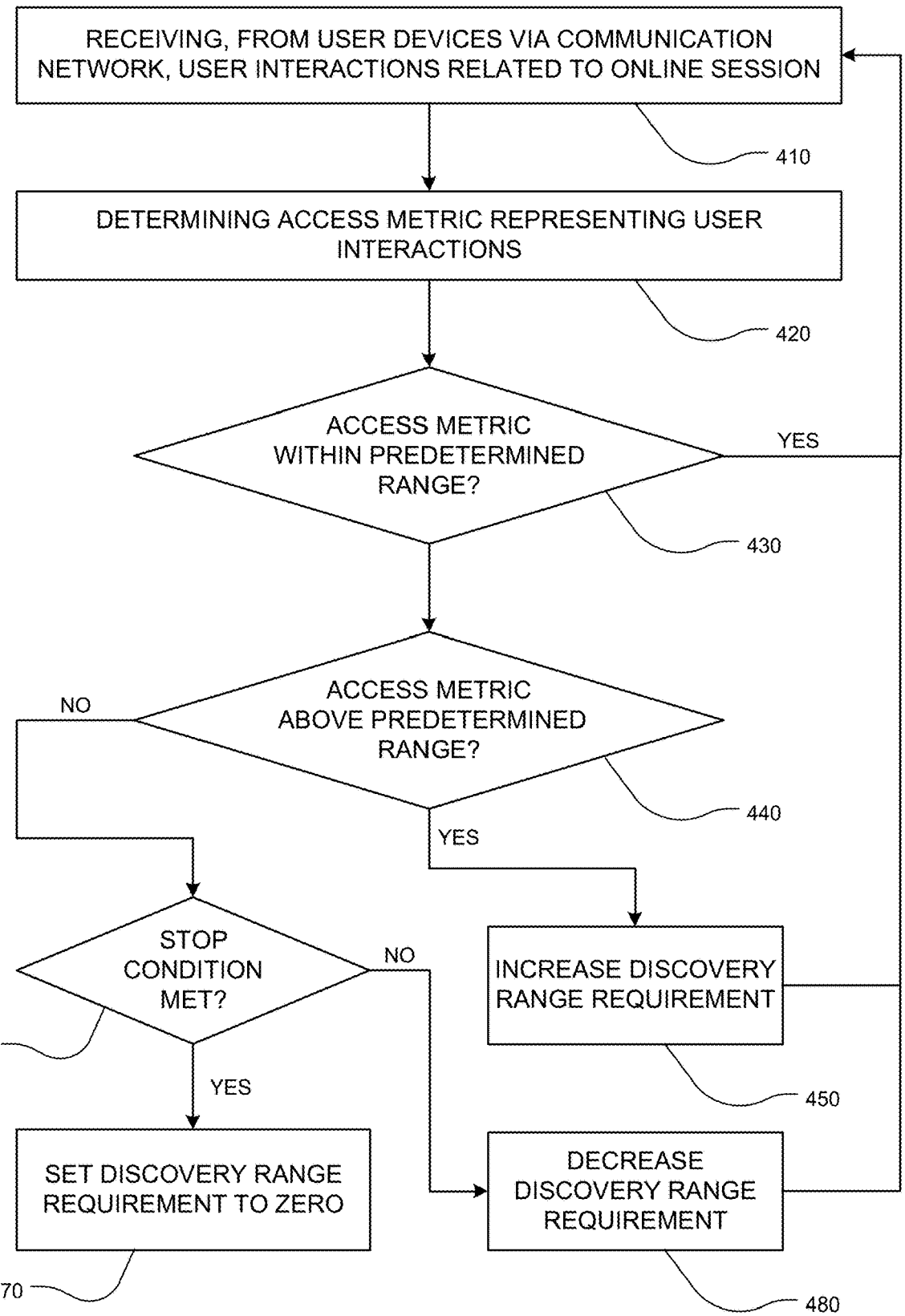
FIG. 4 illustrates a flowchart of an example process for adjusting a discovery range requirement based on an access metric representing user interactions with the online session shown in FIG. 2B.
Figure 5A:
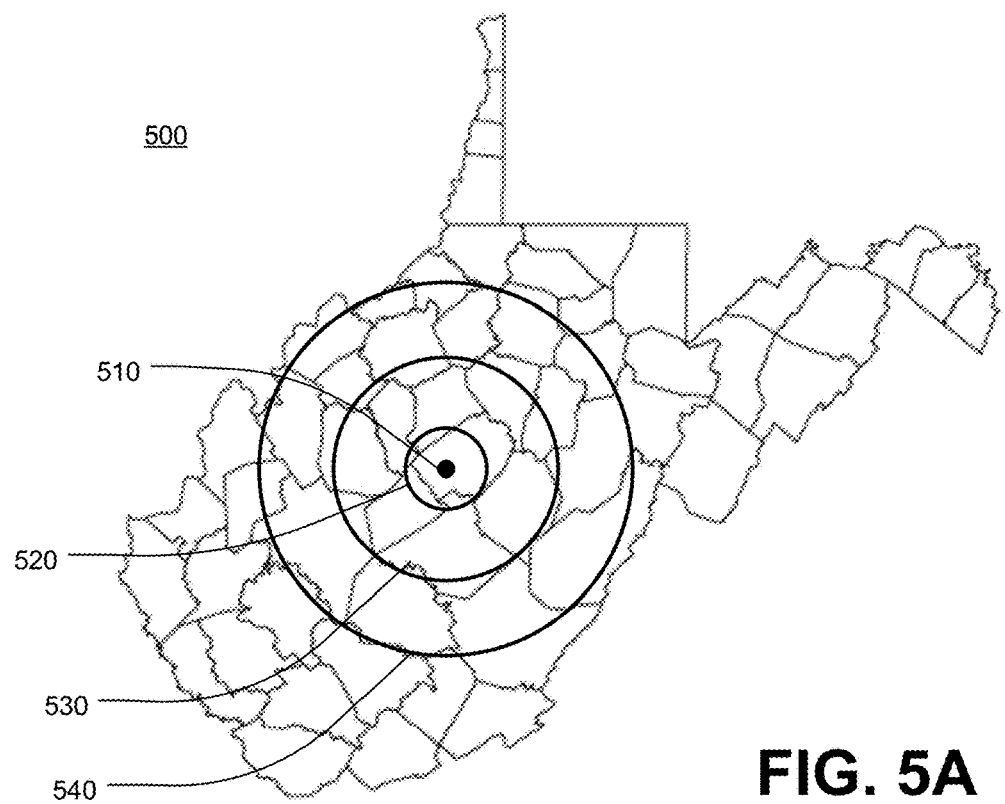
FIGS. 5A and 5B illustrate examples of adjusting the discovery range requirement based on a geographic proximity limit.
Figure 5B:
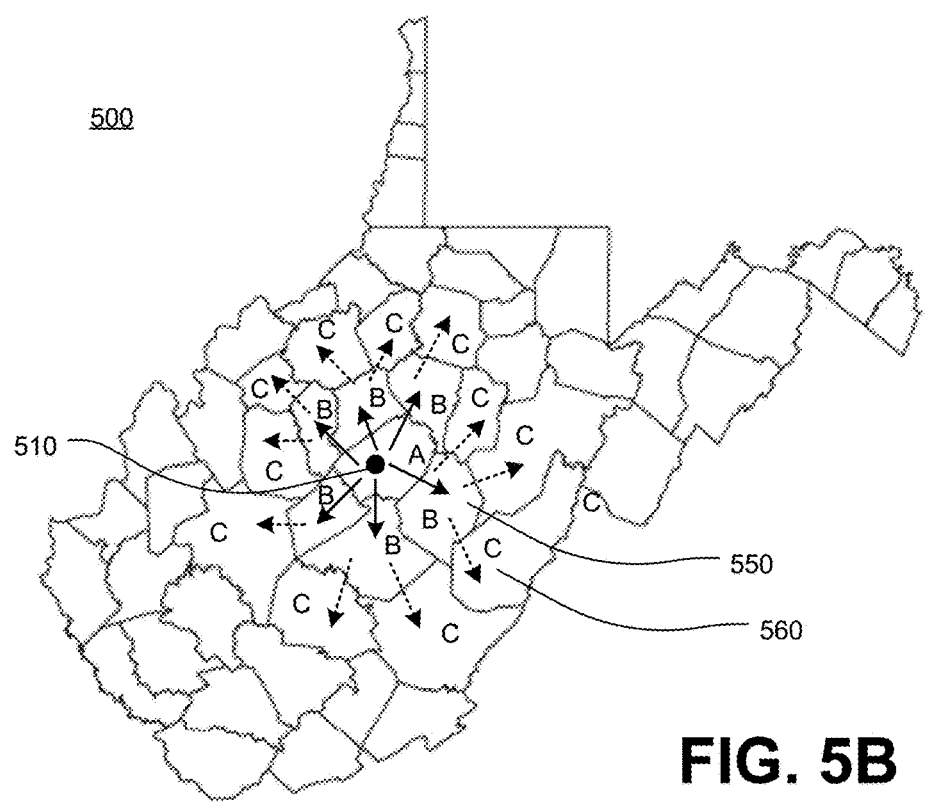
Figure 6:
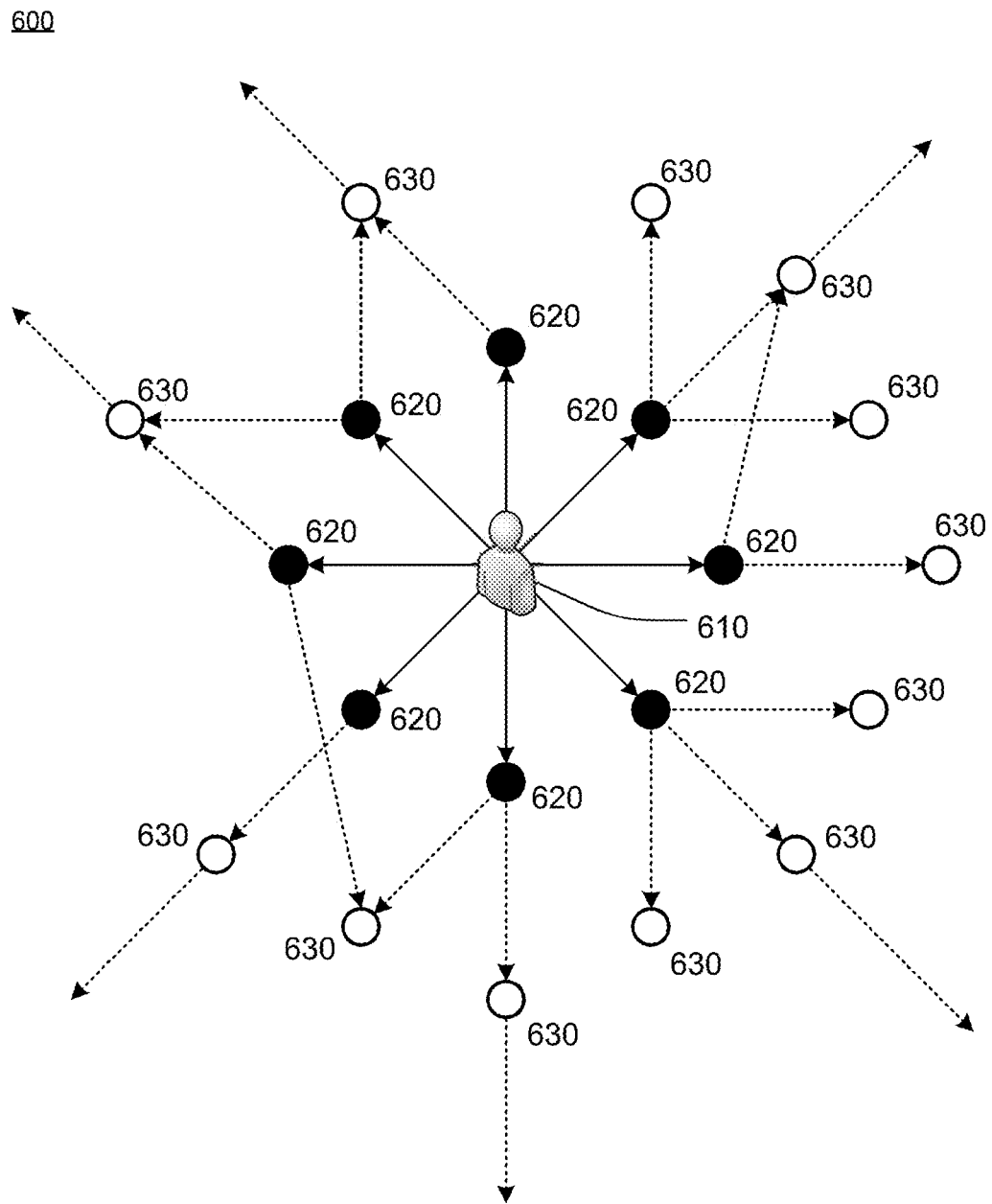
FIG. 6 illustrates an example of adjusting the discovery range requirement based on a social proximity limit.

At step 340, the server 100 may adjust the discovery range requirement based on the determined access metric and range adjustment policy. As described above, the range adjustment policy may specify conditions of the access metric that may trigger adjustment to the discovery range requirement and a manner that the discovery range requirement should be adjusted. An example process for adjusting the discovery range requirement is illustrated in FIG. 4 and described below in detail. Various examples of adjusting the discovery range requirement are illustrated in FIGS. 5A, 5B and 6 and described below in detail.

At step 350, the server 100 may selectively grant the user devices 130 access to the online session based on the adjusted discovery range requirement. This may allow the online session to be discoverable on more or fewer user devices 130. For example, when a large volume of the user interactions is detected, the server 100 may increase or expand the discovery range limit such that the online session may be discoverable on more user devices 130. When the user interactions dwindle down, the server 100 may decrease or shrink the discovery range limit and the online session may be discoverable on fewer user devices 130.

This may result in a technical advantage of reducing or eliminating unnecessary or irrelevant online sessions from showing up on the user devices 130 and displaying relevant online sessions on the user devices 130. Also, the online session may be exposed to a target demographic.

FIG. 4 illustrates a flowchart of an example process 400 for operating a data processing system to adjust a discovery range requirement based on an access metric representing user interactions related to an online session. As described above, the data processing system may be the server 100 of FIG. 1.

With reference to FIG. 1, at step 410, the server 100 may receive, from the user devices 130 within the discovery range requirement, user interactions related to an online session. As described above, the user interactions may include the users' selection of and participation to the online session. At step 420, the server 100 may determine an access metric representing the user interactions. The access metric may be implemented as a numeric value within an access metric range.

At step 430, the server 100 may determine whether the access metric is within a predetermined range, for example, a no-adjustment zone described above. If the access metric is within the no-adjustment zone (YES at step 430), and the process 400 may loop back to step 410 to receive new user interactions and determine an access metric based on the newly received user interactions (at step 420). If the access metric is not within the no-adjustment zone (NO at step 430), the server 100 may determine, at step 440, whether the access metric is above the predetermined range. The access metric may transition over the no-adjustment zone when a volume of the user interaction is high enough to increase the discovery range requirement. Hence, when the access metric is above the predetermined range (YES at step 440), the server 100 may increase the discovery range requirement at step 450.

If the access metric is not above the predetermined range (NO at step 440), the server 100 may then determine whether the access metric meets one or more stop conditions at step 460. The range adjustment policy may include one or more stop conditions. The stop conditions may include no or a very low level of the user interactions related to the online session. If the stop condition is met (YES at step 460), the server 100 may set the discovery range requirement to zero or null (at step 470) so that the online session is no longer discoverable on the user devices 130.

If the stop condition is not met (NO at step 460), the server 100 may decrease the discovery range requirement (at step 480) such that the online session is discoverable on a fewer user devices 130. Once the discovery range requirement is increased (at step 450) or decreased (at step 480), the process 400 may loop back to receive updated user interactions from the user device 130 (at 410) and determine the access metric based on the updated user interactions (at 420).

The discovery range requirement may be related to a geographic proximity limit. Alternatively or additionally, the discovery range requirement may be related to a social proximity or an access privilege limit.

FIGS. 5A and 5B illustrate examples of adjusting a geographic proximity limit on a map 500 based on a geographic location associated with an online session. For example, referring to FIG. 5A, the server 100 may receive a request from a user device 130 to create a chatroom related to a dog adoption event at a location 510 in Braxton county, West Virginia. The location 510 associated with the chatroom is referred to as an epicenter. The server 100 may then create and host the chatroom and set the initial geographic proximity limit to cover an area 520 having a radius of two miles from the epicenter 510. As more and more users provide user interactions related to the chatroom, the access metric may rise above the no-adjustment zone. The server 100 may then increase the geographic proximity limit at a predetermined increment value of, for example, four miles, such that the adjusted discovery range requirement covers an area 530 having a radius of six miles from the epicenter 510.

While the access metric stays above the no-adjustment zone, the geographic proximity limit may be gradually increased at the predetermined increment value, and an area 540 having a radius of ten miles from the epicenter 510 may be covered by the subsequent adjustment to the discovery range requirement. When the access metric drops below the no-adjustment zone, the geographic proximity limit may be gradually decreased, for example, from the area 530 to the area 520, and then from the area 520 to the area 510. When the access metric meets the stop condition, the geographic proximity limit may be set to zero or null such that the online session is no longer discoverable on any of the user devices 130.

In another implementation, the geographic proximity limit may be adjusted in a more flexible manner. For example, as shown in FIG. 5B, the server 100 may set the initial geographic proximity limit to cover a county or city A where the epicenter 510 is located. The server 100 may then determine an access metric from the user interaction. Similar to the access metric described above, the access metric may be implemented as an access metric range including a no-adjustment zone. When the access metric is within the no-adjustment zone, the server 100 may not adjust the geographic proximity range. When the access metric becomes larger than the no-adjustment zone, the server 100 may expand the geographic proximity limit to the counties or cities B that immediately surround the county or city A. The expansion is shown by the arrows having a solid line in FIG. 5B. In the subsequent expansion, the geographic proximity limit may expand to the counties or cites C that immediately surround the counties or cities B, which is shown by the arrows having a broken line in FIG. 5B. When the access metric drops below the no-adjustment zone, the geographic proximity limit may be adjusted to shrink the coverage area in a reversed order. For example, the counties or cities C may be dropped from the geographic proximity limit. In the next adjustment, the counties or cities B may be dropped, and eventually the country or city A may be dropped from the geographic proximity limit when the access metric meets the stop condition.

In another implementation, the discovery range requirement may be related to a social proximity limit. FIG. 6 illustrates an example of adjusting a social proximity limit, which may be adjusted by increasing or decreasing a degree of separation with respect to a person or group associated with the online session. For example, a chatroom may be created regarding a wedding ceremony of a person 610. The wedding ceremony is a significant event to the family, friends and acquaintances of the person 610, but may be of very little or no relevance to those who do not have any personal relationship to the person 610. Hence, a user's geographic proximity to the person 610 or the ceremony location may not be important for this scenario. Instead, the server 100 may adjust the social proximity limit to the person 610 such that the chatroom is discoverable by the users 130 having a certain degree of social proximity. For example, the server 100 may identify users 620 who has a direct social connection with the person 610 on one or more social networks (e.g., Facebook™ LinkedIn™, Twitter™, Instagram™, Snapchat™, etc.). In other words, the users 620 having a single degree of separation from the person 610 on one or more social networks are identified. Then, the server 100 may identify users 630 having two degrees of separation from the person 610 on the one or more social networks. This may continue until users having predetermined degrees (e.g., three or four degrees) of separation from the person 610 on the one or more social networks are identified.

Referring again to FIG. 6, a social proximity map 600 is shown. In the map 600 social connections having a single degree of separation from the person 610 are shown by the arrows having a solid line, and social connections having two or more degrees of separation from the person 610 are shown by the arrows having a broken line.

The server 100 may then set an initial social proximity limit, which may be defined as a degree of separation from the person 610 on one or more social networks. For example, the initial social proximity limit may be set to cover a single degree of separation from the person 610. The chatroom may then become discoverable on the user devices 130 of the users 620 having the direct social connection with the person 610. As the interactions with the online session by the users 620 increase, the server 100 may expand the social proximity limit to cover two degrees of separation from the person 610 such that the chatroom may also become discoverable on the user devices 130 of the users 630. The social proximity limit may continue to expand while the access metric stays above the no-adjustment zone. When the wedding ceremony is over, the user interactions related to the chatroom may dwindle down. Then, the server 100 may gradually decrease or shrink the social proximity limit.

When the user interactions meet the stop condition, the server 100 may then set the social proximity limit to zero or null such that the chatroom is no longer discoverable on any of the user devices 130.

As described above, the discovery range requirement may be related to an access privilege limit. The access privilege limit may include a level or type of privilege associated with a user or an online session. The access privilege limit may be adjusted by increasing or decreasing an access privilege level or type associated with the online session. For example, a chatroom may be created to discuss an issue among staff members of a company, in which the members are divided into a staff group, management group and executive group. Initially, the chatroom may not be discoverable by the management and executive groups. However, as the chatroom becomes more active, the access privilege limit may be gradually expanded to cover the management group and then the executive group. This may allow the management and executive group to quickly learn about the issues that are important to the staff members. As another example, an online session may be associated with an access permission limit, such as an access control list (ACL), which may contain a permission list of one or more individual users, groups, organizations, etc. The server 100 may then limit the access to the online session such that the online session is discoverable by only those included in the permission list. For example, an online session may be associated with a specific Internet domain or IP (Internet Protocol) address range for an organization to allow the online session to be discoverable only by the members of the organization connected to the organization's network.

Accordingly, the disclosure provide a scheme for dynamically adjusting a discovery range requirement for an online session based on user interactions related to the online session. The scheme provides a technical solution of identifying and providing online sessions having a higher relevance to each user. The scheme also provides a technical solution of allowing users to quickly discover, join and participate in online sessions that are highly relevant to them. Furthermore, an online session may be directly exposed to a target demographic, which may in turn contribute to increasing the discovery range requirement. Hence, both SNS companies and users may benefit from the dynamic discovery range requirement adjustment scheme described in this disclosure.

Figure 7:
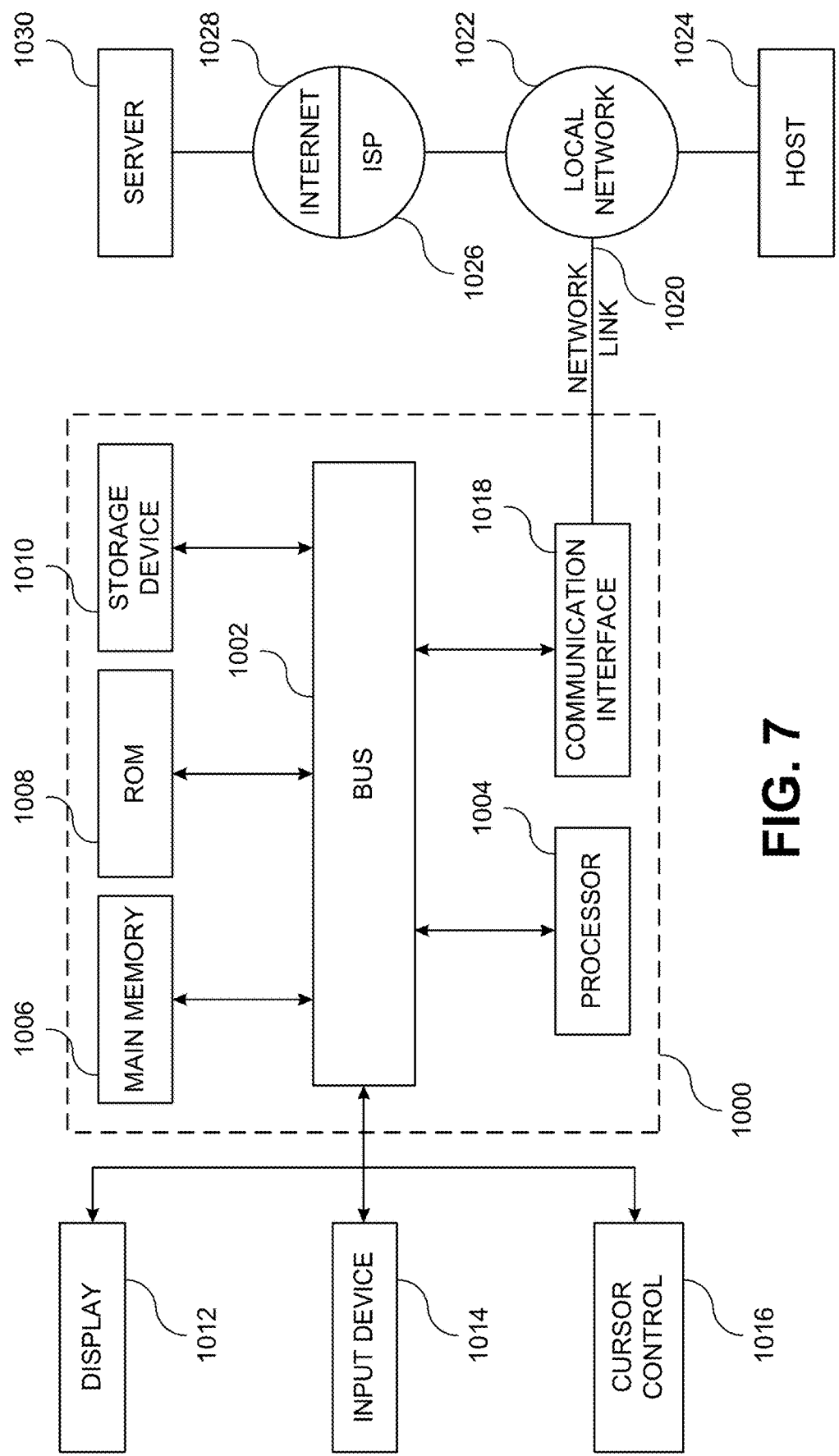
FIG. 7 illustrates a block diagram showing an example computer system upon which aspects of this disclosure may be implemented.

FIG. 7 illustrates a block diagram showing an example a computer system 1000 upon which aspects of this disclosure may be implemented. The computer system 1000 may include a bus 1002 or other communication mechanism for communicating information, and a processor 1004 coupled with the bus 1002 for processing information. The computer system 1000 may also include a main memory 1006, such as a random-access memory (RAM) or other dynamic storage device, coupled to the bus 1002 for storing information and instructions to be executed by the processor 1004. The main memory 1006 may also be used for storing temporary variables or other intermediate information during execution of instructions to be executed by the processor 1004. The computer system 1000 may implement, for example, the server 100 and user device 130.

The computer system 1000 may further include a read only memory (ROM) 1008 or other static storage device coupled to the bus 1002 for storing static information and instructions for the processor 1004. A storage device 1010, such as a flash or other non-volatile memory may be coupled to the bus 1002 for storing information and instructions.

The computer system 1000 may be coupled via the bus 1002 to a display 1012, such as a liquid crystal display (LCD), for displaying information. One or more user input devices, such as the example user input device 1014 may be coupled to the bus 1002, and may be configured for receiving various user inputs, such as user command selections and communicating these to the processor 1004, or to the main memory 1006. The user input device 1014 may include physical structure, or virtual implementation, or both, providing user input modes or options, for controlling, for example, a cursor, visible to a user through display 1012 or through other techniques, and such modes or operations may include, for example virtual mouse, trackball, or cursor direction keys.

The computer system 1000 may include respective resources of the processor 1004 executing, in an overlapping or interleaved manner, respective program instructions. Instructions may be read into the main memory 1006 from another machine-readable medium, such as the storage device 1010. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1010. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1000 may also include a communication interface 1018 coupled to the bus 1002, for two-way data communication coupling to a network link 1020 connected to a local network 1022. The network link 1020 may provide data communication through one or more networks to other data devices. For example, the network link 1020 may provide a connection through the local network 1022 to a host computer 1024 or to data equipment operated by an Internet Service Provider (ISP) 1026 to access through the Internet 1028 a server 1030, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for dynamically adjusting a discovery range of an online session, comprising:
a processor; and
a computer readable medium in communication with the processor, the computer readable medium comprising executable instructions that, when executed by the processor, cause the data processing system to perform:
hosting an online session associated with an access policy for selectively granting access to the online session, wherein the online session is accessible via a communication network and the access policy includes a discovery range requirement by which the online session is discoverable by devices in communication with the data processing system via the communication network;
selectively granting access to the online session to one or more of the devices that satisfy the discovery range requirement;
detecting activities related to the online session by one or more users of the one or more devices granted the access to the online session;
determining an access metric representing a degree of the online session-related activities by the one or more users of the one or more devices granted the access to the online session;
adjusting the discovery range requirement based on the determined access metric and a range adjustment policy specifying conditions of the access metric that trigger adjustment to the discovery range requirement and a manner that the discovery range requirement should be adjusted, wherein the discovery range requirement is adjusted to allow the online session to be discoverable by more devices when the determined access metric indicates an increase in the online session-related activities and to allow the online session to be discoverable by fewer devices when the determined access metric indicates a decrease in the online session-related activities; and
selectively granting the devices access to the online session based on the adjusted discovery range requirement.

2. The data processing system of claim 1, wherein the online session includes a group conferencing session.

3. The data processing system of claim 1, wherein the discovery range requirement is related to at least one of a geographic proximity limit, social proximity limit and access privilege limit.

4. The data processing system of claim 3, wherein the geographic proximity limit is adjusted by increasing or decreasing a distance from a geographic location associated with the online session.

5. The data processing system of claim 3, wherein the social proximity range limit is adjusted by increasing or decreasing a degree of separation with respect to a person or group associated with the online session.

6. The data processing system of claim 3, wherein the access privilege limit is adjusted by increasing or decreasing an access level associated with the online session.

7. The data processing system of claim 1, wherein the access metric is determined based on at least one of:
a number of the devices participating in the online session;
a number of the online session-related activities;
a number of the devices joining the online session;
a number of the devices leaving the online session; and
a time of a latest activity related to the online session.

8. The data processing system of claim 7, wherein the discovery range requirement is increased at a predetermined increment value when the determined access metric is greater than a predetermined range.

9. The data processing system of claim 7, wherein the discovery range requirement is decreased at a predetermined decrement value when the determined access metric is less than a predetermined range.

10. The data processing system of claim 1, wherein the discovery range requirement is set such that the online session is not discoverable by any of the devices when the determined metric meets a predetermined stop condition.

11. A method for operating a data processing system for dynamically adjusting a discovery range of an online session, the method comprising:
    hosting an online session associated with an access policy for selectively granting access to the online session, wherein the online session is accessible via a communication network and the access policy includes a discovery range requirement by which the online session is discoverable by devices in communication with the data processing system via the communication network;
    selectively granting access to the online session to one or more of the devices that satisfy the discovery range requirement;
    detecting activities related to the online session by one or more users of the one or more devices granted the access to the online session;
    determining an access metric representing a degree of the online session-related activities by the users of the devices granted the access to the online session;
    adjusting the discovery range requirement based on the determined access metric and a range adjustment policy specifying conditions of the access metric that trigger adjustment to the discovery range requirement and a manner that the discovery range requirement should be adjusted, wherein the discovery range requirement is adjusted to allow the online session to be discoverable by more devices when the determined access metric indicates an increase in the online session-related activities and to allow the online session to be discoverable by fewer devices when the determined access metric indicates a decrease in the online session-related activities; and
    selectively granting the devices access to the online session based on the adjusted discovery range requirement.

12. The method of claim 11, wherein the discovery range requirement is related to at least one of a geographic proximity limit, social proximity limit and access privilege limit.

13. The method of claim 12, wherein the geographic proximity limit is adjusted by increasing or decreasing a distance from a geographic location associated with the online session.

14. The method of claim 12, wherein the social proximity range limit is adjusted by increasing or decreasing a degree of separation with respect to a person or group associated with the online session.

15. The method of claim 12, wherein the access privilege limit is adjusted by increasing or decreasing an access level associated with the online session.

16. The method of claim 11, wherein the access metric is determined based on at least one of:
    a number of the devices participating in the online session;
    a number of the online session-related activities;
    a number of the devices joining the online session;
    a number of the devices leaving the online session; and
    a time of a latest activity related to the online session.

17. The method of claim 16, wherein the discovery range requirement is increased at a predetermined increment value when the determined access metric is less than a predetermined range.

18. The method of claim 16, wherein the discovery range requirement is decreased at a predetermined decrement value when the determined access metric is less than a predetermined range.

19. The method of claim 11, wherein the discovery range requirement is set such that the online session is not discoverable by any of the devices when the determined metric meets a predetermined stop condition.

20. A non-transitory computer readable medium containing instructions which, when executed by a processor, cause the processor to control a system for dynamically adjusting a discovery range of an online session to perform:
    hosting an online session associated with an access policy for selectively granting access to the online session, wherein the online session is accessible via a communication network and the access policy includes a discovery range requirement by which the online session is discoverable by devices in communication with the system via the communication network;
    selectively granting access to the online session to one or more of the devices that satisfy the discovery range requirement;
    detecting activities related to the online session by one or more users of the one or more devices granted the access to the online session;
    determining an access metric representing a degree of the online session-related activities by the users of the devices granted the access to the online session, the activities performed by users of the devices granted the access to the online session;
    adjusting the discovery range requirement based on the determined access metric and a range adjustment policy specifying conditions of the access metric that trigger adjustment to the discovery range requirement and a manner that the discovery range requirement should be adjusted, wherein the discovery range requirement is adjusted to allow the online session to be discoverable by more devices when the determined access metric indicates an increase in the online session-related activities and to allow the online session to be discoverable by fewer devices when the determined access metric indicates a decrease in the online session-related activities; and
    selectively granting the devices access to the online session based on the adjusted discovery range requirement.

* * * * *